United States Patent Office 3,524,909
Patented Aug. 18, 1970

3,524,909
PREPARATION OF HYDROCARBON THIOALKYLENE PHOSPHITES
Harry Braus, Springdale, and Jay R. Woltermann, Cincinnati, Ohio, assignors to National Distillers and Chemical Corporation, New York, N.Y., a corporation of Virginia
No Drawing. Filed Dec. 27, 1966, Ser. No. 604,656
Int. Cl. C07f *9/08;* C08f *45/58*
U.S. Cl. 260—968                                12 Claims

ABSTRACT OF THE DISCLOSURE

A process for the preparation of hydrocarbon thioalkylene phosphites is provided within a haloalkylene phosphite is reacted with an alkali metal mercaptide to form the hydrocarbon thioalkylene phosphite. The phosphites are thermal stabilizers for poly olefins.

---

This invention relates to a process for the preparation of hydrocarbon thioalkylene phosphites, by reacting a halo phosphite with an alkali metal mercaptide.

A number of procedures for the preparation of hydrocarbon thioalkylene phosphites are known. For example, such compounds have been prepared by reacting an alkyl halide with a mercaptan to form the corresponding hydroxyalkyl sulfide in accordance with Reid, E. E. Organic Chemistry of Bivalent Sulfur, Chem. Pub. Co., N.Y. (1960) vol. II, pp. 206–9, and then reacting the latter compound in slight excess of stoichiometric proportions with an alkyl phosphite, or with phosphorus trichloride in the presence of a tertiary amine base in accordance with Kosolapoff, G. M., Organophosphorus Compounds, J. Wiley & Sons, N.Y. (1950), pp. 184–5. The first step of this synthesis is, however, difficult to carry out with long chain aliphatic and aromatic halides and mercaptans, and yields are poor. Also, such starting materials are usually rare compounds and must be specially prepared.

T. Ya Medved et al. (Inst. Heteroorg. Compds. Moscow) Izvest. Akad, Nauk S.S.S.R., Otdel, Khim. Nauk 1958, pp. 1212–18, Chem. Abs. 53, 4111a (1959), describe a process for preparing hydrocarbon thioalkylene phosphites by the reaction of an appropriate $\alpha,\omega$-alkylene chlorohydrin to form a mercaptan, which is subsequently transesterified using triphenyl phosphite plus sodium ethylate to form the corresponding hydrocarbon thioalkylene phosphite in accordance with Kosolapoff, G.M., ibid, pp. 191–2. These starting materials are also frequently hard to come by, and the first stage reaction is also difficult.

In accordance with the invention, a process is provided for the preparation of hydrocarbon thioalkylene phosphites, which comprises reacting a halo phosphite with an alkali metal mercaptide. The reaction proceeds under moderate conditions, in good yields, in accordance with the following equation:

$$\text{RSM} + \text{P}\begin{pmatrix}\text{O}-Z_1\\\text{O}-Z_2\\\text{O}-Z_3\end{pmatrix} \longrightarrow \text{P}\begin{pmatrix}\text{O}-A-S-R\\\text{O}-Z_2\\\text{O}-Z_3\end{pmatrix}$$

In the above formulae, R is an organic radical, usually a hydrocarbon radical, M is an alkali metal, usually sodium, at least one of $Z_1$, $Z_2$ and $Z_3$ is a haloalkylene radical, and the remainder are the same or different haloalkylene radicals, or hydrogen or another organic radical, and A is an alkylene radical.

The process is applicable to a large class of alkali metal mercaptides, and haloalkylene phosphites, to prepare any hydrocarbon thioalkylene phosphite having from one to three hydrocarbon thioalkylene groups per phosphite group. Thus, the process is applicable to the preparation of any hydrocarbon thioalkylene phosphites having the formula:

$$\text{P}\begin{pmatrix}\text{O}-A-S-R\\\text{O}-Z_2\\\text{O}-Z_3\end{pmatrix}$$

A is an alkylene group having from two to about twenty carbon atoms, straight chain or branched. Additional inert substituents can be present, such as hydroxyl, nitro, alkoxy, and halogen and cycloaliphatic and aromatic groups. R is a hydrocarbon group having from one to about thirty carbon atoms, such as an alkyl, alkenyl, aryl, alkylaryl, aralkyl or cycloaliphatic group. $Z_2$ and $Z_3$ are hydrogen or an organic radical having from one to about thirty carbon atoms. They can, for instance, be another A—S—R group. They can be monovalent or polyvalent, and if monovalent, can be any of the R hydrocarbon groups noted above. If polyvalent, they can be bivalent, with the other valence linked to a further phosphite group, or both $Z_2$ and $Z_3$ can be taken together, and linked to the same phosphite group. Polyvalent groups include alkylene, arylene, alkylene-arylene, aryl-alkylene, alkyl-arylene, cycloalkyl-alkylene, alkyl-cycloalkylene, and cycoalkyl-arylene.

These can be prepared from corresponding halo-alkylene phosphites and alkali metal mercaptides. The phosphite reactants can be defined by the formula:

$$\text{P}\begin{pmatrix}\text{O}-Z_1\\\text{O}-Z_2\\\text{O}-Z_3\end{pmatrix}$$

At least one of $Z_1$, $Z_2$ and $Z_3$ is a haloalkylene radical of the form AX, in which X is halogen, such as chlorine, bromine or iodine, and A is as defined above. The remaining Z radicals are as defined above.

Typical A radicals include $-CH_2-$; $-CH_2CH_2-$; $-CH_2CH_2CH_2-$; $-CH-CH-$; $-[CH_2]_4-$
                                         |   |
                                         $CH_3$ $CH_3$ $-[CH_2]_5-$; $-[CH_2]_8-$; $-[CH_2]_6-$; $-[CH_2]_{10}-$; $-CH_2-CH-$
                                                                         |
                                                                         $CH_3$ $\phantom{xxx}CH_3$
$-CH_2-\overset{|}{\underset{|}{C}}-CH_2-$; $-CH_2-CH-$; $-CH_2-CH-$
$\phantom{xxx}CH_3$                        $\phantom{x}C_3H_7$    $\phantom{x}C_2H_5$ $-CH_2-CHCH_2-CH-CH_2-$; $-C-\overset{CH_3}{\underset{|}{C}H_2}-$; $-CH_2CH-CH_2-$
$\phantom{xx}|\phantom{xxxxx}|$                                          $\phantom{xxx}|$
$\phantom{x}CH_3\phantom{xxx}CH_3$                                       $\phantom{xx}CH_3$ (with phenyl/thiophenyl substituents)

$-CH_2-CH-CH_2-$; $-CH_2-\overset{}{\underset{}{C}}-CH_2-$; $-\overset{Cl}{\underset{|}{CH}}-\overset{Cl}{\underset{|}{CH}}-$; $-CH_2CH-$
                                                                                                                                              |
                                                                                                                                           $C_6H_{13}$ $-CH_2CH_2CH-CH_2-$; $-CH_2-CH-$
$\phantom{xxxxx}|$              $\phantom{xx}|$
$\phantom{xxxx}NO_2$            $\phantom{x}O-CH_3$ $-CH_2-CH-$
(with chlorophenyl substituent)

As typical R radicals there can be mentioned methyl, ethyl, propyl, isopropyl, butyl, sec-butyl, tert-butyl, isoamyl, hexyl, octyl, isooctyl, 2-ethyl-hexyl, nonyl, tetradecyl, octadecyl, lauryl, decyl, palmityl, stearyl, oleyl, phenyl, 4 - tert-butylphenyl, 2-methyl-4-tert-butylphenyl, benzyl, α- and β-phenethyl, xylyl, tolyl, naphthyl, ethenyl, allyl, 1-propenyl, 2-butenyl, cyclopentyl, cyclohexyl, and cyclodecyl.

Examples of mono-(haloalkylene) phosphites which react in the process of the invention include chloromethylene dihydrogen phosphite, β-chloroethylene dihydrogen phosphite, β-bromoethylene dihexyl phosphite, α-iodoethylenedioctyl phosphite, α-chloroethylene diisopropyl phosphite, 1-bromo-2-ethylene hexyl diphenyl phosphite, α-chloropropylene ethylene phosphite, 8-chloro-octyl hexylene monohydrogen phosphite, β-chloroethylene methylthioethyl dihydrogen phosphite, α-bromopropylene allyl monohydrogen phosphite, α-iodobutylene diethenyl phosphite, α-chlorohexylene 2-methylphenyl monohydrogen phosphite, β-bromoethylene di(α-phenethyl) phosphite, iodomethylene dicyclohexyl phosphite, chloromethylene phenylene phosphite, 3-bromopentylene ethylenephenylene phosphite, 2-chlorobutylene β-phenethylene phosphite, 1-iodohexylene-2-ethylphenylene phosphite, 2-chlorodecylene-cyclohexylene phosphite and the like.

Exemplary of di(haloalkylene) phosphites which react in the process include di(β-chloroethylene) monohydrogen phosphite, di(6-bromo-2-ethylhexylene) monohydrogen phosphite, ethyl di(β-chloroethylene) phosphite, β-chloroethylene-β-chloropropylene phenyl phosphite, di (1-chloro-2-ethylphenylene) isooctyl phosphite, decyl di (β-bromoethylene) phosphite, di(δ-chlorobutylene) monohydrogen phosphite, di(2 - chlorohexylene) 1-propenyl phosphite, di(1-chlorobutylene) 2-methyl phenyl phosphite, di(3-iodostearylene) β - phenethyl phosphite, 3-chlorohexylene 2-chloroethylene benzyl phosphite, di (chloromethylene) cyclohexyl phosphite, and the like.

Examples of tri(haloalkylene) phosphites suitable for use in the process of the instant invention include tri (chloromethylene) phosphite, tri(β-chloroethylene) phosphite, tri(β-bromoethylene) phosphite, tri(β-iodoethylene) phosphite, tri(α-chloropropylene) phosphite, tri(δ-chlorobutylene) phosphite, tri(ε-bromopentylene) phosphite, tri(β - chlorooctylene) phosphite, tri(β-chlorononylene) phosphite, tri(δ-bromodecylene) phosphite, tri(2-chlorododecylene) phosphite, tri(9,12-dichlorostearylene) phosphite and the like.

These are for the most part known compounds and are readily prepared by conventional processes. See Kabachnik et al., Izvest. Akad. Nauk S.S.S.R. Otdel Khim. Nauk 1946, p. 295 (Kosolapoff, Organophosphorus Compounds, 1950, p. 208, ref. 101).

The alkali metal mercaptides reactive in the process of the instant invention can be defined by the following formula:

R—S—M

M is an alkali metal, such as sodium, potassium and caesium, and R is as defined above.

The alkali metal mercaptide can be prepared by reacting the corresponding mercaptan with the free alkali metal. This is also a known procedure. See Reid, E. E., Organic Chemistry of Bivalent Sulfur, ibid, vol. I, pp. 127-29.

The organic solvent employed is inert to alkali metal, and can be any of those set out hereinafter and used as the reaction medium in preparing the phosphite.

Exemplary alkali metal mercaptides include sodium ethyl mercaptide, sodium isobutyl mercaptide, sodium propyl mercaptide, sodium isopropyl mercaptide, potassium propyl mercaptide, potassium tert-butyl mercaptide, cesium amyl mercaptide, sodium isoamyl mercaptide, sodium 2-ethylhexyl mercaptide, potassium isooctyl mercaptide, cesium heptyl mercaptide, sodium dodecyl mercaptide, sodium isononyl mercaptide, potassium stearyl mercaptide, sodium phenyl mercaptide, sodium xylyl mercaptide, potassium tolyl mercaptide, sodium benzyl mercaptide, potassium p-ethylphenyl mercaptide, cesium isoamyl phenyl mercaptide, sodium dodecyl phenyl mercaptide, sodium stearyl phenyl mercaptide, sodium oleyl phenyl mercaptide, potassium naphthyl mercaptide, sodium cyclohexyl mercaptide, and potassium cyclopentyl mercaptide.

Examples of mono hydrocarbon thioalkylene substituted phosphites prepared in accordance with the process of the instant invention include β-laurylthioethylene dihydrogen phosphite, isooctylthiobutylene isooctyl phosphite, phenylthiomethylene dihydrogen phosphite, 2-ethylhexylthioethylene allyl monohydrogen phosphite, tolylthio-α-methylethylene dipropyl phosphite, cyclohexylthiomethylene di-cyclopentyl phosphite, decylthiodecylene ethylene phosphite, methoxy thioethylene phenylene phosphite, isooctylthiooctylene di(2-t-butylphenyl) phosphite, 1-propenylthioethylene dixylyl phosphite, naphthylthiopropylene dihydrogen phosphite, ethylthio-2-phenylpropylene dihydrogen phosphite, and methylthio-2-cyclohexylene propyl monohydrogen phosphite.

Examples of di-hydrocarbon thioalkylene substituted phosphites prepared in accordance with the process of the instant invention include di-(2-ethylhexylthioethylene) hydrogen phosphite, (ethyl)-(2-ethylhexylthioethylene) (2-ethylthiomethylene) phosphite, (methylthioethylene) (isooctyl-thioethylene) hydrogen phosphite, (methyl) (isooctylthioethylene) (butylthio-2-methylethylene) phosphite, (phenylthioethylene) (2-ethylhexylthiomethylene) hydrogen phosphite, (2-ethylhexyl) di(2-methylphenylthioethylene) phosphite, di(phenylthioethylene) phenyl phosphite, di(cyclohexythiomethylene) allyl phosphite, (phenylthiononylene) (tolylthiomethylethylene) benzyl phosphite, di(decylthiododecylene) tolyl phosphite, di(methylthio-2-diphenyl propylene) hydrogen phosphite, di(butylthio-1,2-di-chloro ethylene) hydrogen phosphite, (decyl) di(decylthiododecylene) phosphite, di(benzylthiostearylene) nonyl phosphite, di(palmitylthio-α-methylethylene) hydrogen phosphite and di(methoxythioethylene) hydrogen phosphite.

The tri-hydrocarbon thioalkylene substituted phosphites which can be prepared in accordance with the process of the instant invention include
tri(β-laurylthioethylene) phosphite,
tri(phenylthioethylene) phosphite,
tri(isooctylthiobutylene) phosphite,
(monophenylthioethylene) (di-2-ethylhexylthio-
  ethylene) phosphite,
(2-ethylhexylthioethylene) (diphenylthiomethylene)
  phosphite,
(isopropylthiohexylene) (di-isooctylthiomethylene)
  phosphite,
(di-isooctylthiomethylene) (monotolylthio-α-methyl-
  ethylene) phosphite,
tri(2-ethylhexylthioethylene) phosphite,
(phenylthioethylene) di(cyclohexylthioethylene)
  phosphite,
tri(phenylthiononylene) phosphite,
(allylthiononylene) di(phenylthiomethylene)
  phosphite,
tri(decylthiododecylene) phosphite,
tri(benzylthiostearylene) phosphite,
tri(palmitylthio-α-methylethylene) phosphite, and
tri(methoxylthioethylene) phosphite.

In a preferred embodiment of the instant process, trialkylphenylmercaptoalkylene phosphite compounds are produced by reacting a tri(chloroalkyl) phosphite and a sodium alkylphenyl mercaptide compound in accordance with the invention. The trialkylphenylmercaptoalkylene phosphite produced can be defined by the formula:

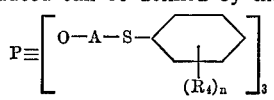

in which A is the same as that described hereinbefore. $R_4$ is an alkyl group having from one to twelve carbon atoms and $n$ is an integer from one to five. The alkylene group can have a straight or branched chain. Usually, the phosphite will not have more than about sixty carbon atoms.

As typical $R_4$ radicals there can be mentioned methyl, ethyl, propyl, isopropyl, butyl, sec.-butyl, tert-butyl, isoamyl, hexyl, octyl, isooctyl, 2-ethyl hexyl, nonyl, lauryl, and decyl.

Examples of trialkylphenylmercaptoalkylene phosphites prepared in accordance with the process of the instant invention include tri(2-methyl-4-tert-butylphenyl-thioethylene) phosphite,
tri(4-tert-butylphenylthioethylene) phosphite,
tri(2-tert-butylphenylthiopropylene) phosphite,
tri(2-ethyl-4-tert-butyl-phenylthioethylene) phosphite,
tri(4-tert-butyl-2-ethylphenylthioethylene) phosphite,
tri-(2-methyl-4-tert-butyl-phenylthioneopentylene) phosphite,
tri(4-isoamyl-phenylthioethylene) phosphite,
tri(4-isopropylphenylthiopropylene) phosphite,
tri(4-ethyl-phenylthioethylene) phosphite,
tri(2,4-diethyl-phenylthioethylene) phosphite,
tri(2,4-di-tert-butylphenylthioethylene) phosphite,
tri(4-hexylphenylthioethylene) phosphite,
tri(2,4,5-triethylphenylthioethylene) phosphite,
tri(2,4,5-tri-butyl-phenylthioethylene) phosphite,
tri(4-isooctyl-phenylthiobutylene) phosphite,
mono(4-tert-butylphenylthioethylene) di-(2-ethylhexylphenylthioethylene) phosphite,
tri(3-nonyl-phenylthiobutylene) phosphite,
(2, 4-di-isooctylphenylthio-α-methyl-ethylene) phosphite,
di-(3,5-di-isooctylphenylthioethylene) mono(4-nonylphenylthio-α-methylethylene) phosphite,
tri(2,4-diethylhexylphenylthioethylene) phosphite,
mono(2-tert-butylphenylthioethylene) di(4-hexylphenylthioethylene) phosphite,
tri(2-nonylphenylthiobutylene) phosphite,
tri(2,4,5-tridecylphenylthiopropylene) phosphite,
tri(2-methyl-3-ethyl-4-decyl-phenylthiopropylene) phosphite,
tri(4-laurylphenylthiopropylene) phosphite,
tri(ethylthio-2-nitrobutylene) phosphite,
and tri(isopropylthio-2-(2,4-dichlorophenyl)-ethylene) phosphite.

The terms "mercapto" and "thio" are used interchangeably herein.

In the process of the invention, the alkali metal mercaptide, and haloalkylene phosphite are dispersed in a water-immiscible solvent and then brought to reaction temperature. From one to three moles of the mercaptide is used per mole of the phosphite, according to the number of hydrocarbon thioalkylene groups to be introduced, from one to three per phosphite group. Satisfactory organic solvents include benzene, carbon tetrachloride, nitrobenzene, chlorobenzene, toluene, octane, heptane, hexane, petroleum ether, naphthenic hydrocarbons, xylene, mesitylene, and ethyl benzene. The concentration of the reactants is in no way critical.

The reaction proceeds at room temperature, but an elevated temperature is usually desirable to save time. A suitable rate of reaction is obtained at temperatures within the range from about 50 to about 225° C. There is no upper limit, except that imposed by the boiling point of the solvent and the stability of the reaction products and of the reactants. A preferable temperature is within the range from about 75 to about 150° C.

The alkali metal mercaptide and the phosphite can be sensitive to oxygen and to moisture. Therefore, the reaction system should be dry and preferably is anhydrous, and oxygen should be excluded. An inert atmosphere can be used, such as nitrogen, helium and argon.

In some cases, carbon dioxide is inert also, and can be used.

The reaction is normally quantitative if the byproduct, alkali metal halide, is removed from the system. An inert solvent in which alkali metal halide is insoluble is a convenient way of doing this. A circulatory system that removes alkali metal halide as it precipitates, by filtration or by centrifugation, is also helpful.

The reaction product is easily recovered by removal of solvent, before or after separation of the alkali metal halide.

The following examples in the opinion of the inventors represent preferred embodiments of the invention.

EXAMPLE 1

Tri(2 - methyl - 4 - tert-butylphenylthioethylene)phosphite was prepared as follows:

4-tert-butyl-o-thiocresol (54.1 g., 0.3 mole) was added to a cold stirred solution of 6.9 g. sodium metal (0.3 atom) in 200 ml. of ethanol. The reaction was slightly exothermic. Ethanol (100 ml.) was evaporated from the resulting solution of sodium 4-tert-butyl-o-thiocresylate, which was then stoppered and set aside for future use.

Tri($\beta$-chloroethylene) phosphite (26.9 g., 0.1 mole) and 100 ml. of benzene were charged under a slow stream of nitrogen to a dry one-liter flask, equipped with a stirrer, nitrogen inlet, thermometer, and addition funnel, protected from water with a drying tube (CaSO$_4$), and a reflux condenser also protected from water with a drying tube (CaSO$_4$). This solution was heated to reflux with stirring, and the sodium thiocresylate solution was added slowly thereto. The pH was between 6 and 7 as determined by the use of water-wetted pH indicator paper. Heating was continued for one hour after the addition was complete. Sodium chloride precipitated, and upon completion of the reaction was removed by filtering the contents of the flask while hot. The filtrate was stripped of solvent under reduced pressure, and the residue was treated with carbon black and filtered.

Infrared and chemical analysis confirmed the structure of the product. Chemical analysis showed

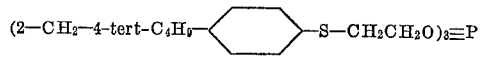

|  | Percent | |
| --- | --- | --- |
|  | Theoretical | Actual |
| Carbon | 67.7 | 66.83 |
| Hydrogen | 11.4 | 11.97 |
| Sulfur | 12.5 | 12.69 |

EXAMPLE 2

Tri(4-tert-butylphenylthioethylene) phosphite was prepared as follows:

4-tert-butyl thiophenol (50.5 g., 0.3 mole) was added to a cold stirred solution of 6.9 g. sodium metal (0.3 atom) in 200 ml. of ethanol. The reaction was slightly exothermic. Ethanol (100 ml.) was evaporated from the resulting solution of sodium 4-tert-butyl-thiophenolate, which was then stoppered and set aside for future use.

Tri($\beta$-chloroethylene) phosphite (26.9 g., 0.1 mole) and 100 ml. of benzene were charged under a slow stream of nitrogen to a dry one-liter flask, equipped with a stirrer, nitrogen inlet, thermometer, and addition funnel, protected from water with a drying tube (CaSO$_4$), and a reflux condenser also protected from water with a drying tube (CaSO$_4$). This solution was heated to reflux with stirring, and the sodium thiocresylate solution was added slowly thereto. The pH was between 6 and 7 as determined by the use of water-wetted pH indicator paper. Heating was continued for one hour after the addition was complete. Sodium chloride precipitated, and upon completion of the reaction was removed by filtering the contents of the flask while hot. The filtrate was stripped of solvent under reduced pressure, and the residue was treated with carbon black and filtered.

Chemical analysis of this product showed

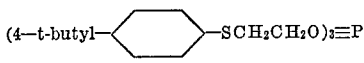

| | Percent | |
|---|---|---|
| | Theoretical | Actual |
| Carbon | 65.5 | 64.7 |
| Hydrogen | 7.8 | 8.26 |
| Sulfur | 14.6 | 14.00 |

EXAMPLE 3

Tri(phenylthioethylene) phosphite was prepared in accordance with the process of the instant invention as follows:

Thiophenol (33.1 g., 0.3 mole) was added to a cold stirred solution of 6.9 g. sodium metal (0.3 atom) in 200 ml. of ethanol. The reaction was slightly exothermic. Ethanol (100 ml.) was evaporated from the resulting solution of sodium phenolate, which was then stoppered and set aside for future use.

Tri($\beta$-chloroethylene) phosphite (26.9 g., 0.1 mole) and 100 ml. of benzene were charged under a slow stream of nitrogen to a dry one-liter flask, equipped with a stirrer, nitrogen inlet, thermometer, and addition funnel, protected from water with a drying tube (CaSO$_4$), and a reflux condenser also protected from water with a drying tube (CaSO$_4$). This solution was heated to reflux with stirring, and the sodium thiocresylate solution was added slowly thereto. The pH was between 6 and 7 as determined by the use of water-wetted pH indicator paper. Heating was continued for one hour after the addition was complete. Sodium chloride precipitated, and upon completion of the reaction was removed by filtering the contents of the flask while hot. The filtrate was stripped of solvent under reduced pressure, and the residue was treated with carbon black and filtered.

Chemical analysis of this product showed

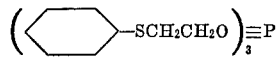

| | Percent | |
|---|---|---|
| | Theoretical | Actual |
| Carbon | 58.6 | 58.68 |
| Hydrogen | 5.5 | 6.50 |
| Sulfur | 19.6 | 19.14 |

EXAMPLE 4

Tri (laurylthioethylene) phosphite was prepared as follows:

Dodecyl mercaptan (60.7 g., 0.3 mole) was added to a cold stirred solution of 6.9 g. sodium metal (0.3 atom) in 200 ml. of ethanol. The reaction was slightly exothermic. Ethanol (100 ml.) was evaporated from the resulting solution of sodium thiolaurylate, which was then stoppered and set aside for future use.

Tri($\beta$-chloroethylene) phosphite (26.9 g., 0.1 mole) and 100 ml. of 1,2-dimethoxyethane were charged under a slow stream of nitrogen to a dry one-liter flask, equipped with a stirrer, nitrogen inlet, thermometer, and addition funnel, protected from water with a drying tube (CaSO$_4$), and a reflux condenser also protected from water with a drying tube (CaSO$_4$). This solution was heated to reflux with stirring, and the sodium thiolaurylate solution was added slowly thereto. The pH was between 6 and 7 as determined by the use of water-wetted pH indicator paper. Heating was continued for one hour after the addition was complete. Sodium chloride precipitated, and upon completion of the reaction was removed by filtering the contents of the flask while hot. The filtrate was stripped of solvent under reduced pressure, and the residue was treated with carbon black and filtered.

Chemical analysis of this product showed $$CH_3(CH_2)_{10}CH_2SCH_2CH_2O)_3 \equiv P$$

| | Percent | |
|---|---|---|
| | Theoretical | Actual |
| Carbon | 65.5 | 66.8 |
| Hydrogen | 11.4 | 12.0 |
| Sulfur | 12.6 | 12.7 |

EXAMPLE 5

Ethylthiomethylene dihydrogen phosphite is prepared as follows:

One mole of ethylsodium mercaptide is reacted with one mole of chloromethylene dihydrogen phosphite in 100 ml. of benzene under a slow stream of nitrogen in a dry one liter flask, equipped with stirrer, nitrogen inlet, thermometer and, addition funnel, protected from water with a drying tube (calcium sulfate), and a reflux condenser also protected from water with a drying tube (calcium sulfate). After heating for one hour, sodium chloride is precipitated and upon completion of the reaction is removed by filtering the contents of the flask while hot. Infrared and chemical analysis confirms the product to be ethylthiomethyl dihydrogen phosphite.

EXAMPLES 6 TO 11

In accordance with the procedure of Examples 1 to 4, various other mono-, di-, and trihydrogen thioalkylene substituted phosphites can be prepared. The table below sets out various alkali metal mercaptides and haloalkylene phosphites, the amounts used of each, and the products obtained by reacting the mercaptide and phosphite in an inert atmosphere in a dry flask protected from water.

TABLE I

| Example No. | Alkali metal mercaptide (moles) | Haloalkylene phosphite (moles) | Hydrocarbonthio alkylene phosphite product |
|---|---|---|---|
| 6 | Sodium ethyl mercaptide (1 mole) | $\beta$-Chloroethylene (di-hydrogen phosphite (1 mole). | Ethylthioethylene dihydrogen phosphite. |
| 7 | Sodium propyl mercaptide (2 moles) | Di(6-bromo-2-ethyl-hexylene) monohydrogen phosphite (1 mole). | Di(propylthio-2-ethylhexylene) monohydrogen phosphite. |
| 8 | Potassium tert-butyl mercaptide (3 moles) | Tri($\beta$-iododecylene) phosphite (1 mole) | Tri(tert-butylthiodecylene) phosphite. |
| 9 | Cesium amyl mercaptide (3 moles) | Tri(9-chlorostearylene) phosphite (1 mole) | Tri(amylthiostearylene) phosphite. |
| 10 | Sodium isononyl mercaptide (2 moles) | Di(3-iodohexylene) $\beta$-phenethyl phosphite (1 mole). | Di(isononylthiohexylene) $\beta$-phenethyl phosphite. |
| 11 | Potassium p-ethylphenyl mercaptide (1 mole). | $\alpha$-Iodobutylene diethenyl phosphite (1 mole). | (p-Ethylphenylthiobutylene) di(ethenyl) phosphite. |

The compounds produced by the process of the invention find utility as thermal stabilizers for polyolefins. These compounds can be used alone or in admixture with other polyolefin stabilizers such as phenols, thiodipropionates, polyvalent metal salts of carboxylic acids, carbon black and the like.

Having regard to the foregoing disclosure, the following is claimed as the inventive and patentable embodiments thereof:

1. A process for the preparation of hydrocarbon thioalkylene-substituted phosphites having the formula

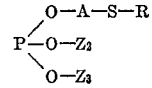

in which A is an alkylene group having from two to about twenty carbon atoms, R is a hydrocarbon group having from one to about thirty carbon atoms, and $Z_2$ and $Z_3$ are hydrogen, or a monovalent or bivalent R group, or another A—S—R group, and may be taken together and linked to the same phosphite group, which comprises reacting a haloalkylene phosphite having the formula

in which from one to three of $Z_1$, $Z_2$ and $Z_3$ is a haloalkylene radical of the form AX in which X is halogen and A is as defined above, and the remaining Z radicals are H, R or AX, with an alkali metal mercaptide having the formula R—S—M, wherein M is an alkali metal and R is a hydrocarbon group having from one to about thirty carbon atoms, at a temperature within the range from about 25 to about 225° C. to form the hydrocarbon thioalkylene phosphite.

2. A process in accordance with claim 1 wherein the haloalkylene phosphite is a chloroalkylene phosphate.

3. A process in accordance with claim 1 wherein the haloalkylene phosphite is a tri(chloroalkylene) phosphite.

4. A process in accordance with claim 1 wherein the haloalkylene phosphite is a di(haloalkylene) phosphite.

5. A process in accordance with claim 1 wherein the haloalkylene phosphite is a mono-haloalkylene phosphite.

6. A process in accordance with claim 1 wherein the alkali metal mercaptide is a sodium mercaptide.

7. A process in accordance with claim 6 wherein the sodium mercaptide is R—S—Na, wherein R is an organic radical having from one to twelve carbon atoms and is selected from the group consisting of alkyl, alkenyl, aryl, alkylaryl, aralkyl, and cycloalkyl radicals.

8. A process in accordance with claim 6 wherein the sodium mercaptide is sodium phenyl mercaptide.

9. A process in accordance with claim 6 wherein the sodium mercaptide is sodium alkylphenyl mercaptide.

10. A process in accordance with claim 1 wherein the reaction is carried out in solution in an inert organic solvent.

11. A process in accordance with claim 1 in which $Z_1$, $Z_2$ and $Z_3$ are all haloalkylene radicals, and the resulting phosphite has three hydrocarbon thioalkylene radicals A—S—R.

12. A process in accordance with claim 11, in which the tri-haloalkylene phosphite is a tri(chloroalkyl) phosphite in which the alkyl radical has from about two to about twenty carbon atoms, and the alkali metal mercaptide is a sodium alkyl phenyl mercaptide in which the alkyl radical contains from one to about thirty carbon atoms.

References Cited

UNITED STATES PATENTS

| | | | |
|---|---|---|---|
| 2,725,311 | 11/1955 | Kenaga et al. | 260—961 XR |
| 3,056,824 | 10/1962 | Hecker et al. | 260—982 XR |
| 3,004,980 | 10/1961 | Schrader | 260—949 XR |
| 3,223,754 | 12/1965 | Collin et al. | 260—948 |

CHARLES B. PARKER, Primary Examiner

A. H. SUTTO, Assistant Examiner

U.S. Cl. X.R.

260—45.95, 936, 937, 948, 949, 958, 967